(12) United States Patent
Mizuno et al.

(10) Patent No.: US 9,669,488 B2
(45) Date of Patent: Jun. 6, 2017

(54) CURRENT DIFFUSION BONDING APPARATUS AND CURRENT DIFFUSION BONDING METHOD

(75) Inventors: Yoshinobu Mizuno, Iwate (JP); Makoto Ito, Iwate (JP); Kozo Ohama, Iwate (JP); Hitoshi Kabasawa, Saitama (JP)

(73) Assignee: ECO-A CO., LTD., Morioka-Shi (JP)

( * ) Notice: Subject to any disclaimer, the term of this patent is extended or adjusted under 35 U.S.C. 154(b) by 451 days.

(21) Appl. No.: 14/355,676

(22) PCT Filed: Nov. 4, 2011

(86) PCT No.: PCT/JP2011/075451
§ 371 (c)(1),
(2), (4) Date: May 1, 2014

(87) PCT Pub. No.: WO2013/065175
PCT Pub. Date: May 10, 2013

(65) Prior Publication Data
US 2014/0299582 A1    Oct. 9, 2014

(51) Int. Cl.
*B23K 11/00*    (2006.01)
*B23K 20/02*    (2006.01)
*B23K 37/04*    (2006.01)
*B23K 103/04*    (2006.01)
*B23K 103/08*    (2006.01)
*B23K 103/10*    (2006.01)
(Continued)

(52) U.S. Cl.
CPC .............. *B23K 11/00* (2013.01); *B23K 20/02* (2013.01); *B23K 37/04* (2013.01);
(Continued)

(58) Field of Classification Search
CPC ........ B23K 11/00; B23K 20/02; B23K 37/04; B23K 2203/05; B23K 2203/26;
(Continued)

(56) References Cited

U.S. PATENT DOCUMENTS 4,441,006 A * 4/1984 Machida .............. B23K 1/0004
219/110
6,521,858 B1 * 2/2003 Barnett .................. B23K 10/02
156/272.2
(Continued)

FOREIGN PATENT DOCUMENTS

GB    WO 2011012906 A1 *  2/2011  ............. B23K 13/01
JP           2006-315040        11/2006
(Continued)

*Primary Examiner* — Arthur O Hall
*Assistant Examiner* — Adam J Rogers
(74) *Attorney, Agent, or Firm* — Rankin, Hill & Clark LLP

(57) ABSTRACT

A current diffusion bonding apparatus (1) includes upper and lower electrodes (11, 12), which sandwich members to be bonded (M, M) and which are electrically conductible with the members to be bonded (M, M); a power supply unit (20), which supplies a current to the electrodes (11, 12); and a pressurizing unit (30), which applies a pressure to bonding surfaces S. If a temperature T detected by a temperature sensor (45) is a first set temperature T1 or lower, the pressurizing unit (30) applies a pressure to the bonding surfaces S while restricting the displacement of the members to be bonded (M, M), and if the temperature T exceeds the first set temperature T1, the pressurizing unit (30) applies a pressure based on the elastic force of a spring (35d), which elastically deforms according to the displacement of the members to be bonded (M, M), to the bonding surfaces S.

11 Claims, 8 Drawing Sheets

(51) Int. Cl.
   *B23K 103/12*   (2006.01)
   *B23K 103/14*   (2006.01)
   *B23K 103/00*   (2006.01)
   *B23K 103/18*   (2006.01)

(52) U.S. Cl.
   CPC ...... *B23K 2203/04* (2013.01); *B23K 2203/05* (2015.10); *B23K 2203/08* (2013.01); *B23K 2203/10* (2013.01); *B23K 2203/12* (2013.01); *B23K 2203/14* (2013.01); *B23K 2203/26* (2015.10); *B23K 2203/50* (2015.10); *B23K 2203/52* (2015.10)

(58) Field of Classification Search
   CPC ............ B23K 2203/50; B23K 2203/52; B23K 2203/04; B23K 2203/08; B23K 2203/10; B23K 2203/12; B23K 2203/14
   USPC ........................................ 219/78.02
   See application file for complete search history.

(56) References Cited

U.S. PATENT DOCUMENTS

| | | | | |
|---|---|---|---|---|
| 6,555,778 | B1* | 4/2003 | Barnett | B23K 10/006 156/272.2 |
| 6,816,671 | B1* | 11/2004 | Reddy | F24H 3/0405 219/121.11 |
| 2002/0011468 | A1* | 1/2002 | Miyasaka | B21D 37/20 219/78.02 |
| 2004/0119038 | A1* | 6/2004 | Crockett | F16K 27/003 251/63.5 |
| 2005/0127044 | A1* | 6/2005 | Nozue | B23K 11/02 219/78.02 |
| 2007/0023401 | A1* | 2/2007 | Tsukamoto | B23K 11/002 219/86.22 |
| 2010/0297463 | A1* | 11/2010 | Hoffstaedter | B23K 20/02 428/573 |
| 2013/0112665 | A1* | 5/2013 | Jin | B23K 11/115 219/78.01 |

FOREIGN PATENT DOCUMENTS

| | | |
|---|---|---|
| JP | 2007-175740 | 7/2007 |
| JP | 2007-253240 | 10/2007 |
| JP | 2007-301590 | 11/2007 |
| JP | 2008-030097 | 2/2008 |
| JP | 2008-290130 | 12/2008 |
| JP | 2009-000712 | 1/2009 |
| JP | 2009-131861 | 6/2009 |
| JP | 2009-226454 | 10/2009 |
| JP | 2010-012492 | 1/2010 |
| JP | 2012-006068 | 1/2012 |

\* cited by examiner

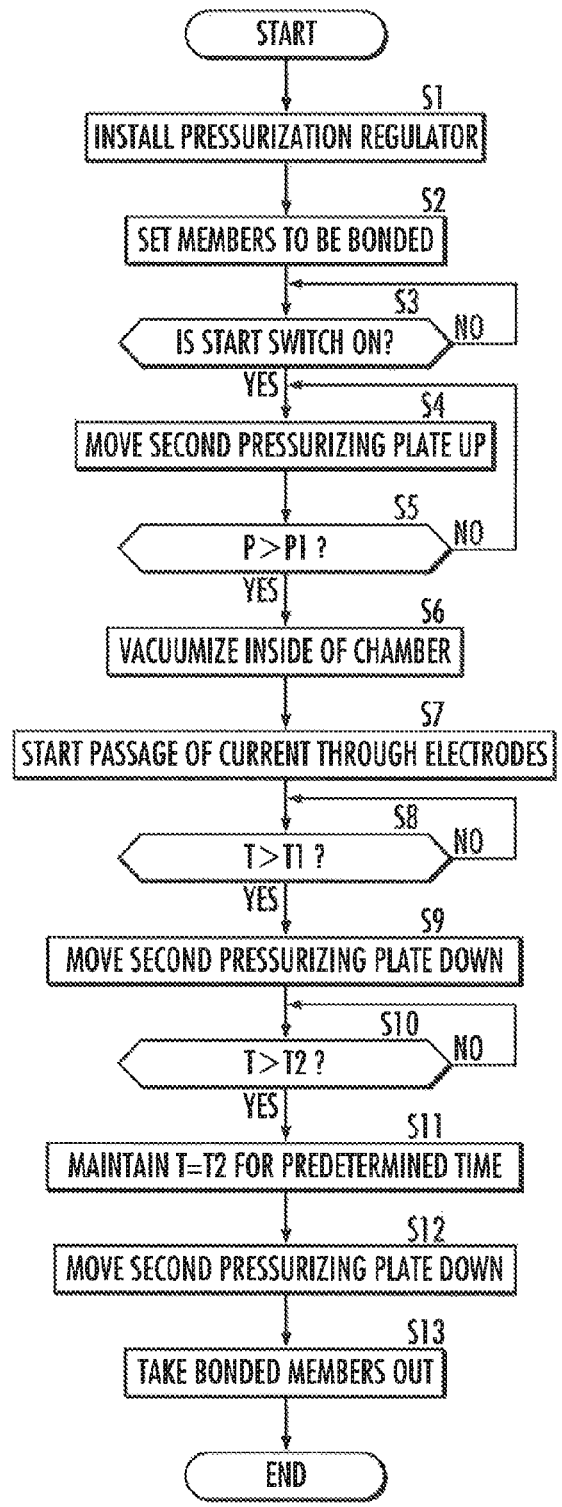

CURRENT DIFFUSION BONDING APPARATUS AND CURRENT DIFFUSION BONDING METHOD

TECHNICAL FIELD

The present invention relates to a current diffusion bonding apparatus and a current diffusion bonding method.

BACKGROUND ART

Hitherto, there has been known current diffusion bonding whereby to carry out bonding by heating metal members within a solid phase temperature range to make use of the diffusion phenomenon of atoms. The current diffusion bonding is ideally suited for bonding the same type of materials or different types of materials composed of difficult-to-weld metal materials.

In the current diffusion bonding, members to be bonded, which are held between electrodes and the bonding surfaces of which are under a pressure applied by a pressurizing mechanism through the electrodes, are heated by passing a pulse current between the electrodes. Then, within a solid phase temperature range of the melting temperature or less of the members to be bonded, the bonding is implemented by the close contact of the bonding surfaces resulting from the softening and deformation of the material and the solid phase diffusion phenomenon.

If any slight gap occurs between the bonding surfaces, then defective bonding results. To prevent such defective bonding, the members to be bonded are heated while being subjected to a high pressure applied by a pressurizing mechanism. However, when the temperature of a base material exceeds a softening start temperature thereof, the members to be bonded develop deformation, such as distortion, bend or compression due to the applied pressure.

As a solution, Patent Document 1 discloses a pulse current bonding apparatus which is provided with a pressure sensor that detects a pressure applied to members to be bonded and which carries out feedback control of a pressing force, which is determined by the materials and dimensions of the members to be bonded, on the basis of a detection value of the pressure sensor. More specifically, in order to prevent the pressure applied to the members to be bonded from increasing due to the thermal expansion of the members to be bonded, the pressing force is feedback-controlled such that the detection value of the pressure sensor remains constant after the passage of a current is started (refer specifically to paragraph 0017 of Patent Document 1). The pressing force is controlled by controlling an electric motor that drives a ball screw unit of a pressing device.

Further, Patent Document 2 discloses a current bonding apparatus which is provided with a temperature detecting means that detects the temperature of a bond portion and a member displacement monitoring unit that monitors members to be bonded for displacement. In a state wherein a temporal change in the temperature of the bond portion is positive, if it is detected that the displacement of the members to be bonded is negative, then the pressurizing force applied to the members to be bonded is decreased. The pressurizing is carried out by a generally used mechanism of a hydraulic type, pneumatic type, mechanical type or the like (refer to paragraph 0021 of Patent Document 2).

CITATION LIST

Patent Literature

Patent Document 1: Japanese Patent Publication Laid-open No. 2007-253240
Patent Document 2: Japanese Patent Publication Laid-open No. 2007-175740

SUMMARY OF INVENTION

Technical Problem

However, the pulse current bonding apparatus disclosed in the aforesaid Patent Document 1 has been posing a problem in that the pressing force is controlled by an electric motor, so that there will be a time lag until the pressing force is changed in response to a detection value of the pressure sensor, causing the members to be bonded to be deformed during the time lag. Further, the current bonding apparatus disclosed in the aforesaid Patent Document 2 has been posing a problem in that members to be bonded inevitably incur compressive deformation, since the pressurizing force is decreased after the member displacement monitoring unit detects that the displacement of the members to be bonded has become negative, i.e. after the member displacement monitoring unit detects that the compressive deformation has occurred.

Especially in the case where members to be bonded are thin-wall members, such as thin-wall pipes, the members are instantly deformed to a significant degree of deformation. In recent years, with the increasing environmental friendliness, which is typically indicated by the popularity of electric vehicles, there has been an increasing demand for bonding thin-wall members with high accuracy. However, no measures for controlling deformation to a few dozen micrometers or less have been achieved.

In view of the above aspects, an object of the present invention is to provide a current diffusion bonding apparatus and a current diffusion bonding method that make it possible to bond, with high accuracy, members to be bonded composed of thin-wall pipe materials or the like.

Solution to Problem

A current diffusion bonding apparatus in accordance with the present invention is a current diffusion bonding apparatus that bonds a plurality of members to be bonded, the bonding surfaces of which are abutted to each other, by the passage of a current through the members to be bonded, including: a plurality of electrodes which sandwich the plurality of the members to be bonded and which are electrically conductible with the plurality of the members to be bonded; a power supply unit that supplies a current to the plurality of electrodes; a first pressurizing unit which applies a pressure to the bonding surfaces while restricting a displacement in a direction of expansion relative to a sandwiching direction of the plurality of the members to be bonded, which are sandwiched by the plurality of the electrodes; a second pressurizing unit which applies a pressure based on an elastic force of an elastic member that elastically deforms according to a displacement in the direction of expansion relative to the sandwiching direction of the plurality of the members to be bonded, which are sandwiched by the plurality of the electrodes, to the bonding surfaces through the plurality of the electrodes; and a pressurization selecting unit which selects either the first or the second pressurizing unit to apply a pressure to the bonding surfaces.

The current diffusion bonding apparatus in accordance with the present invention has the first and the second pressurizing units and the pressurization selecting unit that selects one of the pressurizing units to apply a pressure to the bonding surfaces. The first pressurizing unit applies a pressure while restricting the displacement of the members to be bonded, so that a high pressure will be applied to the bonding surfaces. Hence, a high pressure can be applied to the bonding surfaces by the first pressurizing unit in the case where the bonding surfaces have to be brought into close contact at the time of, for example, starting the passage of a current.

On the other hand, the second pressurizing unit is adapted to apply a pressure based on the elastic force of the elastic member that elastically deforms according to the displacement of the members to be bonded, so that the pressure applied to the bonding surfaces will not be significantly changed even when the members to be bonded are heated and thermally expanded by the passage of a current to the electrodes from the power supply unit. Hence, in the case where it is not desirable to apply an undue pressure to the bonding surfaces when, for example, the temperature of the members to be bonded approaches a softening start temperature, a relatively low pressure can be applied to the bonding surfaces by the second pressurizing unit.

Although the elastic member elastically deforms as the members to be bonded thermally expand, a change in the elastic force due to the deformation is extremely small. Accordingly, the pressure applied to the bonding surfaces by the second pressurizing unit remains substantially constant regardless of the thermal expansion of the members to be bonded. Unlike the apparatuses disclosed in Patent Documents 1 and 2, therefore, there will be no danger of an undue pressure being applied. This makes it possible to bond, with high accuracy, members to be bonded composed of, for example, thin-wall pipe materials.

Further, the pressurization selecting unit selects either the first or the second pressurizing unit to apply a pressure by considering the characteristics of the pressure applied by each of the first and the second pressurizing units, thus making it possible to apply a pressure that is suitable to the conditions of the members to be bonded to the bonding surfaces.

Further, preferably, the current diffusion bonding apparatus in accordance with the present invention is provided with a temperature sensor that detects the temperature of the vicinity of the bonding surfaces of the plurality of the members to be bonded, and the pressurization selecting unit applies a pressure to the bonding surfaces by either the first or the second pressurizing unit according to the temperature detected by the temperature sensor.

In this case, the pressurization selecting unit is capable of switching from the first pressurizing unit to the second pressurizing unit to apply a pressure to the bonding surfaces when the temperature detected by the temperature sensor exceeds a preset temperature, e.g. a temperature that is lower than the softening start temperature of the members to be bonded by a predetermined temperature. This permits successful bonding without causing the deformation of the members to be bonded.

The pressurization selecting unit may be adapted to switch from the first pressurizing unit to the second pressurizing unit according to a condition other than the temperature, such as a condition in which the first pressurizing unit is switched to the second pressurizing unit when preset time elapses from the start of the passage of a current to the electrodes, or a condition including one other than the temperature. Further, the pressurization selecting unit may be adapted to switch from the second pressurizing unit to the first pressurizing unit when, for example, the amount of displacement of the members to be bonded exceeds a preset amount.

Further, in the current diffusion bonding apparatus in accordance with the present invention, preferably, the first pressurizing unit applies a pressure to the bonding surfaces while restricting the positions of the members to which the electrodes are fixed, and the second pressurizing unit applies a pressure to the bonding surfaces while applying the elastic force of the elastic member to the members.

In this case, the first and the second pressurizing units can be easily constructed to be compact.

The current diffusion bonding method in accordance with the present invention is a current diffusion bonding method for bonding a plurality of members to be bonded, the bonding surfaces of which are abutted to each other, by the passage of a current through the members to be bonded, including the steps of: restricting a displacement in an expanding direction relative to a direction in which the plurality of the members to be bonded are sandwiched, applying a pressure to the bonding surfaces to sandwich the members to be bonded between the plurality of electrodes which are electrically conductible with the plurality of the members to be bonded; supplying a current to the plurality of electrodes; and thereafter clearing the restriction on the displacement of the plurality of members to be bonded and applying a pressure, which is based on an elastic force of an elastic member that elastically deforms according to a displacement in the direction of expansion relative to a direction in which the plurality of the members to be bonded are sandwiched by the plurality of the electrodes, to the bonding surfaces through the plurality of the electrodes.

According to the current diffusion bonding method in accordance with the present invention, first, a pressure is applied to the bonding surfaces while restricting the displacement of the members to be bonded. Thus, the bonding surfaces can be brought into close contact by applying a high pressure to the bonding surfaces.

Then, thereafter, a pressure based on the elastic force of the elastic member, which elastically deforms according to the displacement of the members to be bonded, is applied to the bonding surfaces. The elastic member elastically deforms according to the thermal expansion of the members to be bonded. However, a change in the elastic force caused by the deformation is extremely small, so that the pressure applied to the bonding surfaces remains substantially constant regardless of the thermal expansion of the members to be bonded. Thus, unlike the methods disclosed in the aforesaid Patent Documents 1 and 2, the possibility of an undue pressure being applied is eliminated. Hence, even if the members to be bonded are composed of thin-wall pipe materials or the like, highly accurate bonding can be accomplished.

Further, in the current diffusion bonding method in accordance with the present invention, preferably, if the temperature of the vicinity of the bonding surfaces of the plurality of the members to be bonded exceeds a preset temperature, the restriction on the displacement of the plurality of the members to be bonded is cleared and the pressure based on the elastic force of the elastic member is applied to the bonding surfaces through the plurality of the electrodes.

In this case, the restriction on the displacement of the members to be bonded is cleared if the preset temperature, such as a temperature that is lower than the softening start temperature of the members to be bonded by a predetermined temperature, is exceeded, thus preventing an undue pressure from being applied to the members to be bonded.

This permits successful bonding without causing the deformation of the members to be bonded.

The switching condition of the pressure to be applied to the members to be bonded is not limited to the temperature condition, such as when the temperature of the vicinity of the bonding surfaces exceeds a preset temperature. For example, the switching may be implemented according to a condition other than the temperature condition, such as when preset time elapses from the start of the passage of a current to the electrodes, or according to a condition that includes one other than the temperature. Further, the condition may include one according to which the switching is carried out when, for example, the amount of displacement of the members to be bonded exceeds a preset amount.

BRIEF DESCRIPTION OF DRAWINGS

FIG. 8 is a flowchart illustrating a current diffusion bonding method according to a third embodiment of the present invention.

DESCRIPTION OF EMBODIMENTS

The following will describe a current diffusion bonding apparatus 1, which is a first embodiment of the present invention.

Figure 1:
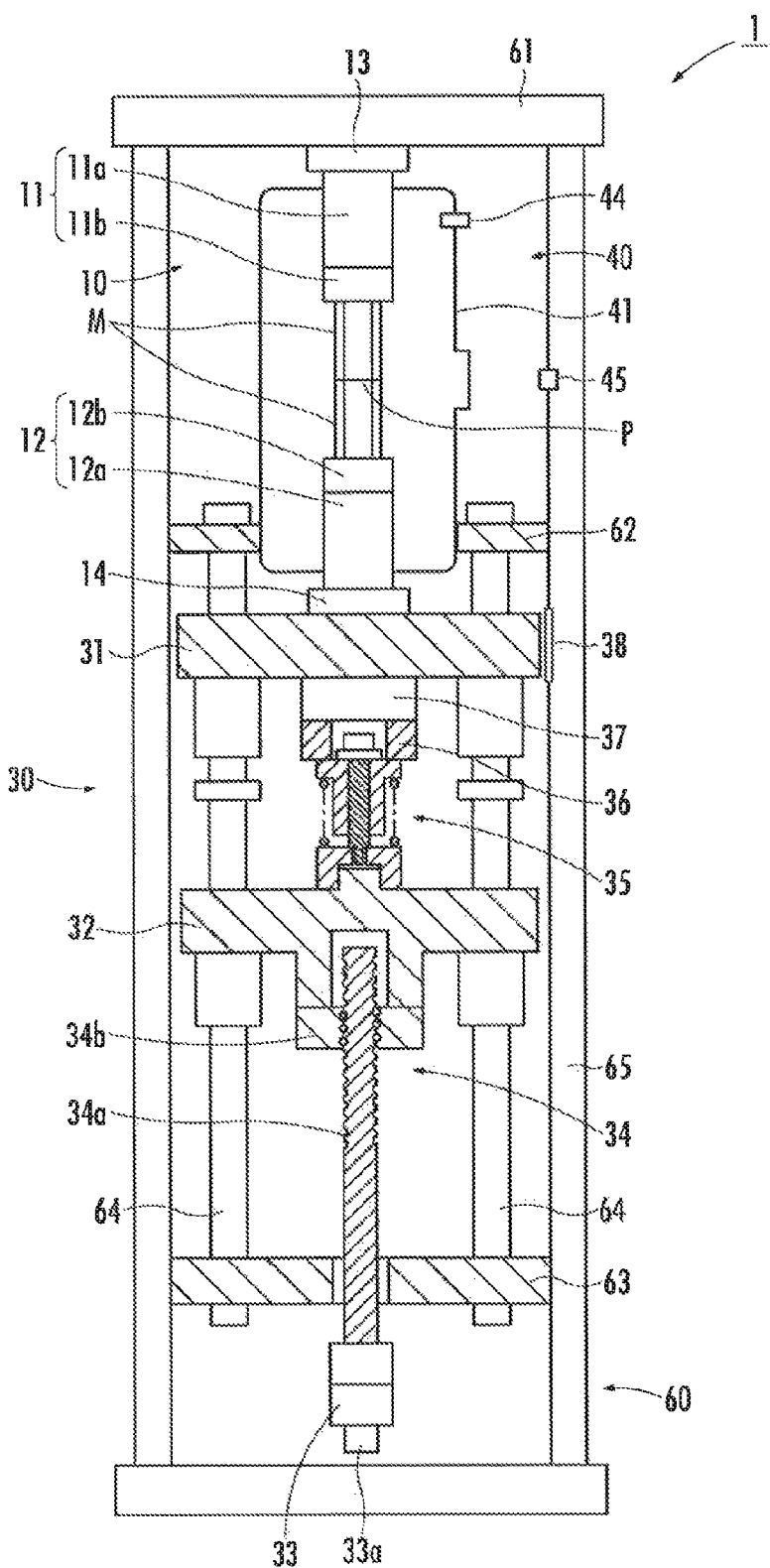
FIG. 1 is a front view of a current diffusion bonding apparatus according to a first embodiment of the present invention.
Figure 2:
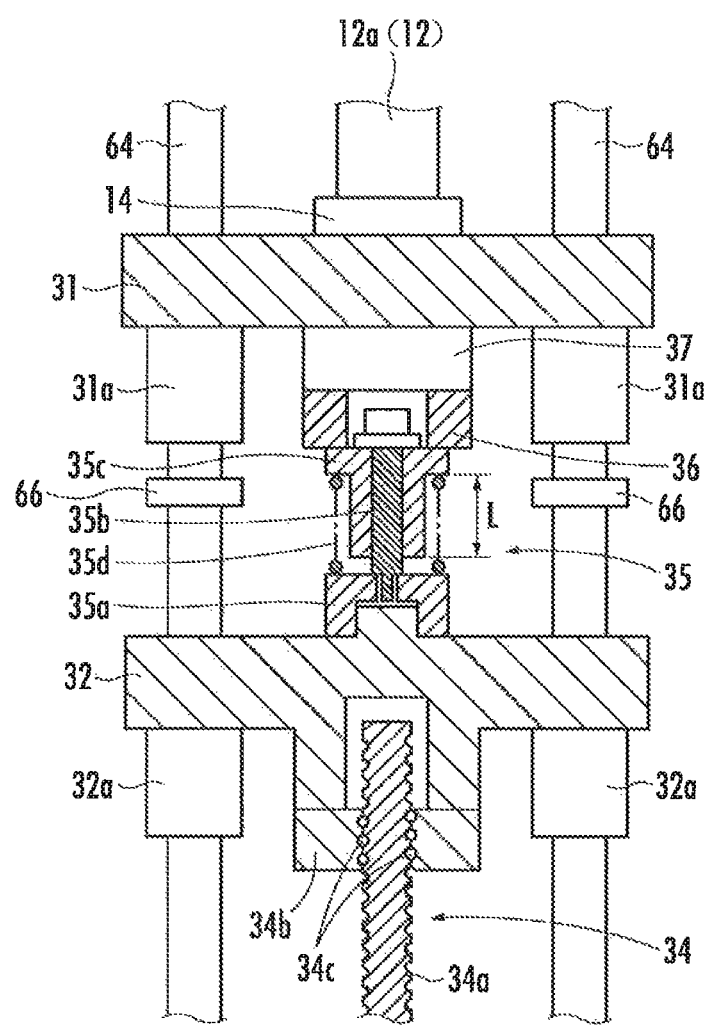
FIG. 2 is an enlarged view illustrating the surrounding of a pressurizing unit in FIG. 1.
Figure 3:
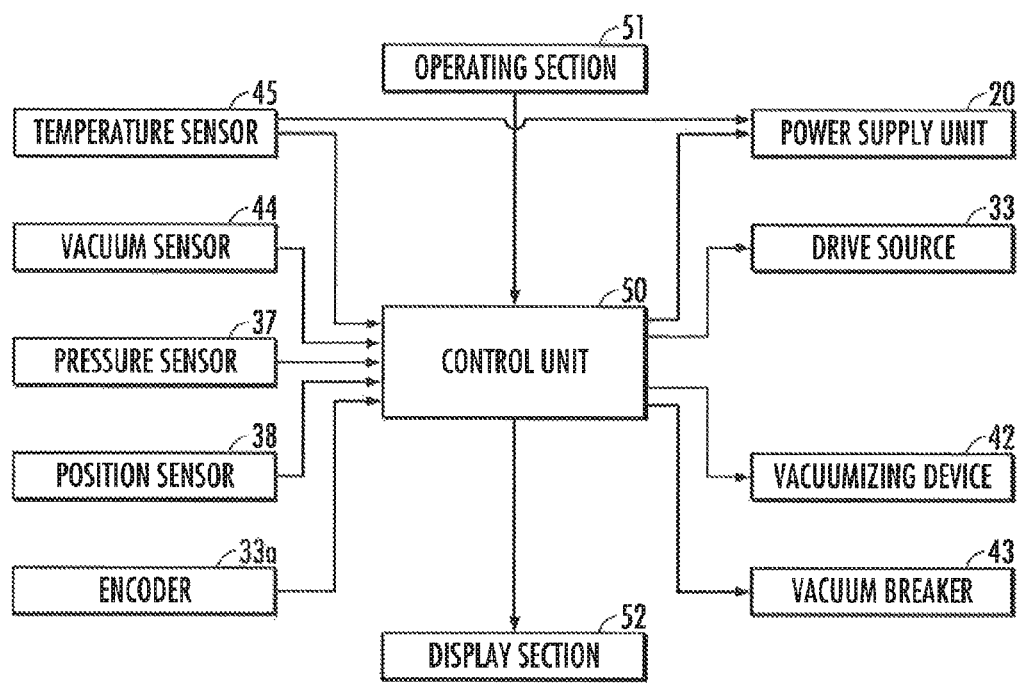
FIG. 3 is a block diagram illustrating a control system of the current diffusion bonding apparatus.

Referring to FIG. 1 to FIG. 3, the current diffusion bonding apparatus 1 bonds the abutted portions of a plurality of (two in this case) members to be bonded M and M, which are in an abutted state. The current diffusion bonding apparatus 1 has an electrode unit 10, a power supply unit 20, a pressurizing unit 30, vacuumizing unit 40, and a control unit 50. The units 10 to 50 are mounted on a chassis 60.

There are no particular limits to the material, the shape and the like of the members to be bonded M insofar as they can be electrically energized. The material of the members to be bonded M may be a metal material, e.g. a steel material, such as stainless steel, a single-element nonferrous metal, such as copper, aluminum, or zinc, or various types of alloys that contain aluminum, nickel, chrome, titanium or copper, or a nonmetal material, such as ceramics, semiconductors or single-crystal materials that exhibit high-temperature electrical conductivity. The members to be bonded M and M may use the same material or different materials.

The members to be bonded M may be shaped like, for example, pipes, bulks, thick plates, or thin plates, or may be provided with arbitrary machining added, such as grooving or drilling. Bonding surfaces S are preferably flat. However, the bonding surfaces S may alternatively be curved surfaces, such as curved surfaces having the same curvature, as long as no gap is formed therebetween. Further, the bonding surfaces S are preferably mirror surfaces, but may be rough surfaces. Three or more members to be bonded may be arranged in series and the individual members to be bonded may be bonded. Further, a positioning pin or the like may be used to position the members to be bonded.

The electrode unit 10 is constituted of a pair of upper and lower electrodes 11 and 12. The upper electrode 11 in the present embodiment is composed of a columnar upper current electrode 11a made of copper, molybdenum, tungsten or the like and a resistive element 11b fixed to the bottom portion of the upper current electrode 11a. The top portion of the upper current electrode 11a is fixed to a top plate 61 of the chassis 60 through the intermediary of an insulator 13.

The lower electrode 12 in the present embodiment is composed of a columnar lower current electrode 12a made of copper, molybdenum, tungsten or the like and a resistive element 12b fixed to the top portion of the lower current electrode 12a. The bottom portion of the lower current electrode 12a is fixed, through the intermediary of an insulator 14, to a movable table 31, which will be discussed hereinafter.

The resistive elements 11b and 12b are formed of a material, such as a carbon composite, silicon carbide or stainless steel, which generates heat when energized.

The upper and the lower electrodes 11 and 12 are disposed such that the axis lines thereof are collinear, the members to be bonded M and M being sandwiched therebetween. Further, the upper and the lower current electrodes 11a and 12a respectively are connected to the power supply unit 20 through cables (not shown) and constructed to be electrically energizable. The bonding surfaces S can be directly heated by passing a current through the upper and the lower current electrodes 11a and 12a with the members to be bonded M and M held between the resistive elements 11b and 12b, and the entire members to be bonded M and M can be evenly heated, permitting continuous bonding to be accomplished in the same process.

Each of the upper and the lower current electrodes 11a and 12a is constructed to be coolable by a cooling fluid, such as pure water or tap water, which is circulated by a cooling mechanism (not shown).

The power supply unit 20 in the present embodiment is an inverter-controlled pulse power supply. The power supply unit 20 is provided with an inverter having rectifier circuits, diodes and thyristors and constructed such that the pulse characteristic adjustment factors, including the pulse waveform, the pulse width, the pulse interval, the current, and the voltage of a pulse to be generated, can be changed by the control unit 50. As the power supply unit 20, a mass-produced commercially available inverter power supply unit can be used.

The pressurizing unit 30 is comprised of the movable table 31 to which the lower current electrode 12a is fixed, a pressurizing plate 32 for transmitting a pressure to the movable table 31, a drive source 33 for driving the pressurizing plate 32, a ball screw mechanism 34 that transmits the driving force of the drive source 33 to move the pressurizing plate 32 up and down, and a pressurization regulator 35 that adjusts the pressure transmitted from the pressurizing plate 32 to the movable table 31.

The movable table 31 has bearings (bushes) 31a at the four corners thereof and is constructed to be vertically slidable relative to four guide rods 64 that vertically connect an upper plate 62 and a lower plate 63 of the chassis 60 through the intermediary of the bearings 31a. The movable table 31 corresponds to a member in the present invention.

The pressurizing plate 32 has bearings (bushes) 32a at the four corners thereof and is constructed to be vertically slidable relative to the four guide rods 64 through the intermediary of the bearings 32a. The pressurizing plate 32 is positioned below the movable table 31 through the intermediary of the pressurization regulator 35.

The drive source 33 in the present embodiment is a servo motor provided with a reduction gear. The servo motor 33 is provided with an encoder 33a and fixed to a lower portion of the chassis 60 by a publicly known fixing means (not shown).

The ball screw mechanism 34 is constructed of a threaded shaft 34a, which extends in the vertical direction and has a thread groove in the outer peripheral surface thereof, a nut 34b, which is fixed to the bottom portion of the pressurizing plate 32 and has a thread groove formed in the inner peripheral surface, and a plurality of balls 34c, which are placed between the aforesaid thread grooves. The threaded shaft 34a is connected to the rotating shaft of the servo motor 33 through the reduction gear. As the servo motor 33 is rotatively driven, the threaded shaft 34a rotates, causing the nut 34b and consequently the pressurizing plate 32 to relatively move up or down with respect to the threaded shaft 34a.

The pressurization regulator 35 is comprised of a base 35a having a fitting concave portion that fits to a convex portion formed at the upper center of the pressurizing plate 32, a spring rod 35b fixed to the base 35a by the threaded portion thereof screwed to a tapped hole formed in the base 35a, a spring block 35c inserted onto the shank of the spring rod 35b such that the spring block 35c is vertically slidable for a predetermined distance between the upper surface of the base 35a and the lower surface of the upper jaw of the spring rod 35b, and a spring 35d, which is disposed by being compressively interposed between the upper surface of the base 35a and the lower surface of the upper jaw of the spring block 35c and which is externally inserted onto the lower main body of the spring block 35c.

The spring 35d corresponds to an elastic member in the present invention. For the spring 35d, a coil spring is used in the present embodiment, but may alternatively be a different type of spring. The upper and the lower electrodes 11 and 12, the ball screw mechanism 34, and the pressurization regulator 35 are arranged such that the axis lines thereof are collinear. The base 35a, the spring rod 35b, and the spring block 35c are formed of a hard material, such as a metal.

An intervening block 36 made of a hard material, such as a metal, is abutted against the upper surface of the spring block 35c. The intervening block 36 is fixed to the lower surface of the movable table 31 through the intermediary of a pressure sensor 37. The pressure sensor 37 is, for example, a one-axis load cell that measures the pressure in the vertical direction. The pressure sensor 37 may alternatively use a multi-axis pressure sensor. The pressure applied to the bonding surfaces S can be indirectly detected by the pressure sensor 37.

The pressurization regulator 35 is changed according to the members to be bonded M and M. A sensor (not shown) that detects the presence of the pressurization regulator 35 is preferably provided.

The rotative driving force of the servo motor 33 is converted into a vertical driving force by the ball screw mechanism 34, causing the pressurizing plate 32 to move up. At this time, in a state wherein the pressurizing plate 32 has risen to an extent at which the full spring length of the spring 35d is compressed to a full length L of the lower main body of the spring block 35c, the pressurizing force of the pressurizing plate 32 is transmitted, without being reduced, to the movable table 31 through the intermediary of the base 35a, the spring block 35c, and the intervening block 36.

When the drive of the servo motor 33 is stopped, the position of the pressurizing plate 32 and consequently the position of the movable table 31 are maintained thereafter. At this time, the pressurizing unit 30 applies a pressure to the bonding surfaces S while restricting the displacement of the members to be bonded M and M, functioning as a first pressurizing unit in the present invention. The pressure applied by the pressurizing unit 30 functioning as the first pressurizing unit ranges, for example, from 5000N to 10000N, depending on the members to be bonded M.

Meanwhile, in a state wherein the full spring length of the spring 35d is longer than the full length L of the lower main body of the spring block 35c, a pressure that is the same as a biasing force (elastic force) of the spring 35d is applied to the movable table 31 through the intermediary of the spring block 35c and the intervening block 36. At this time, the pressurizing unit 30 applies a pressure based on the biasing force of the spring 35d to the bonding surfaces S, functioning as a second pressurizing unit in the present invention. The pressure applied by the pressurizing unit 30 functioning as the second pressurizing unit ranges, for example, from dozens of N to a few hundred N, depending on the members to be bonded M.

A position sensor 38 that detects the position of the movable table 31 is installed on a support 65 of the chassis 60. The position sensor 38 is, for example, a magnetic linear scale (linear encoder), and adapted to detect the vertical position of the movable table 31.

Each of the guide rods 64 has a stopper 66, which is fixed between the movable table 31 and the pressurizing plate 32 to restrict the movable table 31 from moving down beyond a predetermined position. In the present embodiment, a bearing 31a comes in contact with the stopper 66 thereby restricting the movable table 31 from moving further down. The pressurization regulator 35 can be replaced by restricting the descent of the movable table 31, which moves down together with the pressurizing plate 32.

The vacuumizing unit 40 turns the portion that includes at least the bonding surfaces S of the members to be bonded M and M into a vacuum atmosphere. This restrains an oxide film from being generated on the bonding surfaces S, thus achieving easier and robust bonding. The vacuumizing unit 40 in the present embodiment is comprised of a chamber 41, which surrounds the entire members to be bonded M and M, a vacuumizing device 42, which vacuumizes the inside of the chamber 41, and a vacuum breaker 43, which breaks a vacuum state in the chamber 41.

The vacuumizing device 42 is, for example, a vacuum pump that exhausts a gas from the chamber 41 through an intake and exhaust pipe (not shown). The vacuum breaker 43 is, for example, a gas supply pump that supplies a gas into the chamber 41 through the intake and exhaust pipe. The vacuum breaker 43 may alternatively be a valve or the like provided in the intake and exhaust pipe to introduce outside air into the chamber 41.

A vacuum sensor 44 of Pirani type or the like is installed to the chamber 41 to detect the degree of vacuum (pressure)

in the chamber 41. Further, a temperature sensor 45 for detecting the temperature of the vicinity of the bonding surfaces S of the members to be bonded M and M placed in the chamber 41 is installed outside a peep window on the side surface of the chamber 41. The temperature sensor 45 in the present embodiment is a noncontact type, such as an infrared thermometer. The temperature sensor 45 may alternatively be a contact type sensor, such as a thermocouple, which measures a temperature through contact with the vicinity of the bonding surfaces S of the members to be bonded, or may combine a noncontact type and a contact type.

Although not shown, a door for taking the members to be bonded M and M into or out is provided on the front side of the chamber 41. In place of the vacuumizing unit 40, a unit for producing an inert gas atmosphere of nitrogen, argon or the like in the chamber 41 may be used.

The control unit 50 is comprised of a CPU, a ROM, a RAM, I/O and the like, and an operating section 51 and a display section 52 are electrically connected to the control unit 50. The operating section 51 in the present embodiment is comprised mainly of various operating switches, including an activation switch, a start switch, and an input panel formed of a touch panel or the like. The information input through the operating section 51 is transmitted to the control unit 50.

The control unit 50 receives detection signals from the encoder 33a, the pressure sensor 37, the position sensor 38, the vacuum sensor 44, and the temperature sensor 45. Based on the detection signals, information input through the operating section 51, and control information, such as a set pressure P1, a first set temperature T1 and a second set temperature T2, which are stored in a memory of the operating section 51, the control unit 50 outputs control signals to the power supply unit 20, the servo motor 33, the vacuumizing device 42, and the vacuum breaker 43. The control unit 50 corresponds to a pressurization selecting unit in the present invention.

The temperature sensor 45 directly outputs an OFF signal for turning the power off to the power supply unit 20 when a detection temperature exceeds a desired temperature. The temperature sensor 45 also directly outputs an ON signal for turning the power on to the power supply unit 20 when a detection temperature reduces below the desired temperature. Thus, the temperature sensor 45 directly outputs the signals to the power supply unit 20 without the intermediary of the control unit 50, making it possible to promptly set the temperature of the vicinity of the bonding surfaces S of the members to be bonded M and M back to the desired temperature. Hence, the temperature of the vicinity of the bonding surfaces S of the members to be bonded M and M will be always maintained at the desired temperature.

Further, the display section 52 is electrically connected to the control unit 50. The display section 52 in the present embodiment is comprised of a digital display panel, a lamp and the like. The display section 52 receives an input to the control unit 50 or receives from the control unit 50 information based on an arithmetic result provided by the control unit 50, and displays the input and the information.

Figure 4:
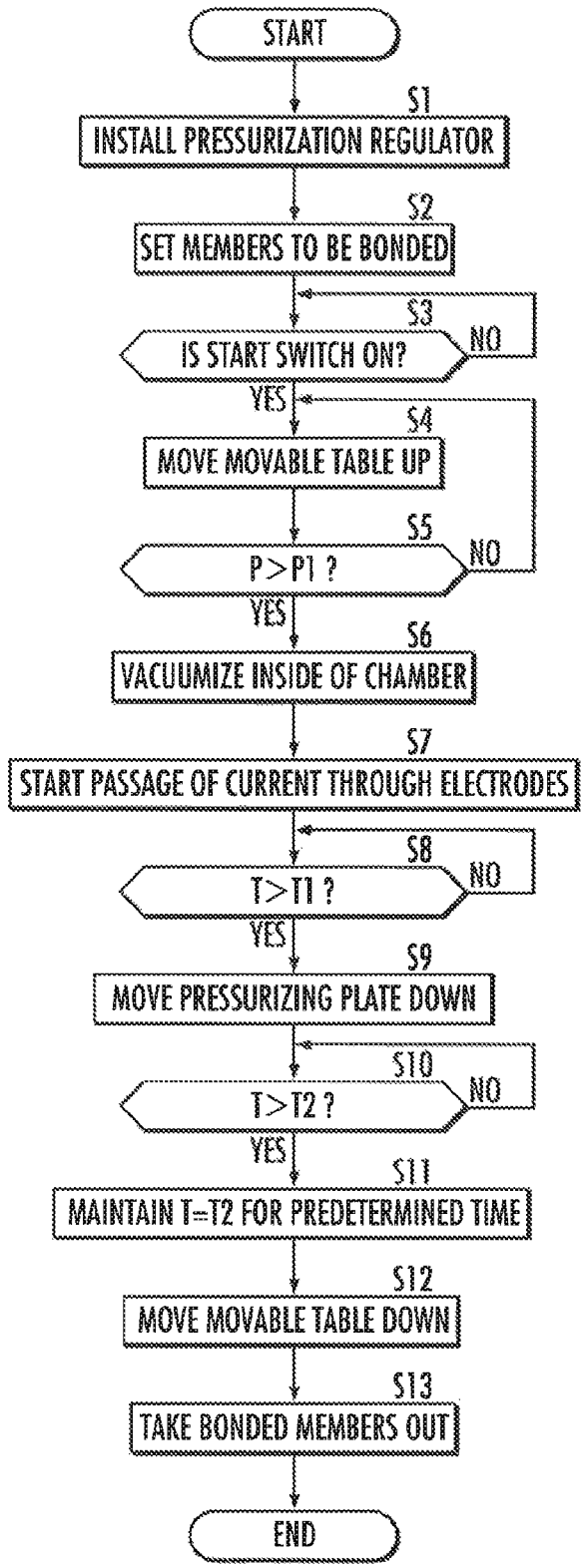
FIG. 4 is a flowchart illustrating a current diffusion bonding method according to a first embodiment of the present invention.
Figure 5:
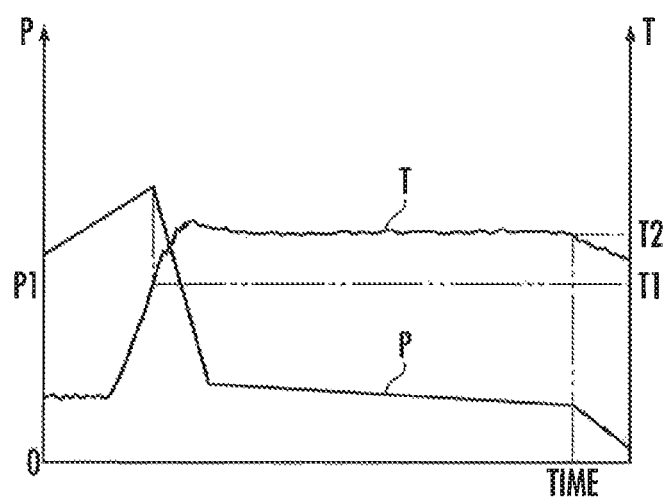
FIG. 5 is a graph illustrating temporal changes in the temperature of a bond portion and pressure in the current diffusion bonding method.

Referring now to FIG. 4 and FIG. 5, the processing for carrying out the current diffusion bonding method according to the first embodiment of the present invention will be explained by using the current diffusion bonding apparatus 1 described above. The processing of S4 to S12 described below is carried out by the control unit 50.

First, an operator sets the pressurization regulator 35 suited for the members to be bonded M and M (S1). Then, the operator sets the members to be bonded M and M between the upper and the lower electrodes 11 and 12 (S2). At this time, a positioning pin or the like may be used to assist the sandwiching of the members to be bonded M and M. Then, the operator closes the door (not shown) of the chamber 41.

When the operator turns on the start switch of the operating section 51 (YES in S3), the servo motor 33 is driven to compress the full spring length of the spring 35d to the full length L of the lower main body of the spring block 35c and to raise the pressurizing plate 32 and consequently the movable table 31 (S4) until a pressure P detected by the pressure sensor 37 exceeds a predetermined set pressure P1 (YES in S5). This causes a predetermined high pressure to be applied to the members to be bonded M and M through the movable table 31, thereby bringing the bonding surfaces S into close contact. The servo motor 33 is feedback-controlled by referring to a detection signal from the encoder 33a.

Subsequently, the vacuumizing device 42 is started. When the degree of vacuum in the chamber 41 detected by the vacuum sensor 44 reaches a predetermined value, the vacuumizing device 42 is stopped. Thus, the inside of the chamber 41 is vacuumized (S6).

While maintaining a state in which a predetermined pressure is being applied to the members to be bonded M and M, the power supply unit 20 is started to energize the upper and the lower electrodes 11 and 12 (S7). Thus, the members to be bonded M and M are heated, and the temperatures thereof increase, causing the members to be bonded M and M to thermally expand.

Thereafter, when the temperature T detected by the temperature sensor 45 exceeds the first set temperature T1, which is lower than a softening start temperature Ts of the members to be bonded M and M by a predetermined temperature (YES in S8), the servo motor 33 is driven to move the pressurizing plate 32 down by a predetermined infinitesimal distance until the full spring length of the spring 35d increases and exceeds the full length L of the lower main body of the spring block 35c (S9). However, the state in which the upper surface of the spring block 35c is in contact with the intervening block 36 is maintained.

Thus, the biasing force of the spring 35d is applied to the movable table 31, and the biasing force maintains the state in which the bonding surfaces S are in close contact. However, the biasing force of the spring 35d is small, so that the base material of the members to be bonded M and M will not develop a deformation, such as distortion, bend or compression even when the temperature of the members to be bonded M and M further approaches the softening start temperature Ts.

Then, when the temperature T detected by the temperature sensor 45 exceeds the second set temperature T2, which is higher than the first set temperature T1 by a predetermined temperature (YES in S10), a state in which the temperature T detected by the temperature sensor 45 is maintained at the second set temperature T2 is continued for a predetermined time (S11). This is carried out by the direct output of the OFF signal or the ON signal to the power supply unit 20 from the temperature sensor 45. During this period of time, the members to be bonded M and M expand due to the thermal expansion, and the pressure P gradually decreases. Then, the bonding surfaces S of the members to be bonded M and M are firmly bonded.

The detection value from the position sensor 38 is monitored to detect whether the movable table 31 has vertically moved, exceeding a preset range since the foregoing state started. If it is detected that the movable table 31 has moved beyond the set range, then the occurrence of the anomaly is displayed on the display section 52.

Further, a detection value from the pressure sensor 37 is monitored to detect whether the pressure P detected by the pressure sensor 37 has exceeded a range having a preset upper limit and a preset lower limit. If a pressure detected by the pressure sensor 37 exceeds the upper limit, then the servo motor 33 is driven to move the pressurizing plate 32 down. Meanwhile, if the lower limit is exceeded, then the servo motor 33 is driven to move the pressurizing plate 32 up. If the pressure sensor 37 detects the pressure P exceeding the set range, then the occurrence of the anomaly is displayed on the display section 52.

However, the aforesaid processing is emergency escape processing in the case of the occurrence of an anomaly. The travel amount of the movable table 31 detected by the position sensor 38 and the pressure P detected by the pressure sensor 37 remain within the set range in the case of normal processing.

Thereafter, the power supply unit 20 is stopped, the vacuum breaker 43 is started to clear the vacuum state in the chamber 41, and the servo motor 33 is driven to move the pressurizing plate 32 and consequently the movable table 31 down (S 12). Then, the operator takes the bonded members out of the chamber 41 (S13).

As described above, the pressurizing unit 30 applies a high pressure to the bonding surfaces S while restricting the displacement of the members to be bonded M and M by the pressurizing plate 32 until the temperature T detected by the temperature sensor 45 exceeds the first set temperature T1 (NO in S8), thus allowing the bonding surfaces S to be brought into close contact.

Then, after the temperature T detected by the temperature sensor 45 exceeds the first set temperature T1 (YES in S8), a pressure based on the elastic force of the spring 35d, which elastically deforms according to the displacement of the members to be bonded M and M, is applied to the bonding surfaces S, so that the pressure to be applied to the bonding surfaces S will not significantly change even when the members to be bonded M and M thermally expand.

Although the spring 35d elastically deforms according to the thermal expansion of the members to be bonded M and M, the change in the elastic force caused by the deformation is extremely small. Therefore, the pressure applied to the bonding surfaces S will remain substantially constant regardless of the thermal expansion of the members to be bonded M and M. Thus, unlike the apparatuses disclosed in Patent Documents 1 and 2, the possibility of an undue pressure being applied can be eliminated. Hence, even in the case where the members to be bonded M and M are formed of thin-wall pipe materials or the like, highly accurate bonding can be accomplished.

Hitherto, thin-wall members formed of thin-wall pipe materials or the like have been bonded by electron beams or brazing, requiring a high level of skill and costs. The use of the current diffusion bonding apparatus 1 makes it possible to automatically bond thin-wall members, which are formed of thin-wall pipe materials or the like, at low cost.

The following will describe a current diffusion bonding apparatus 101, which is a second embodiment of the present invention.

Figure 6:
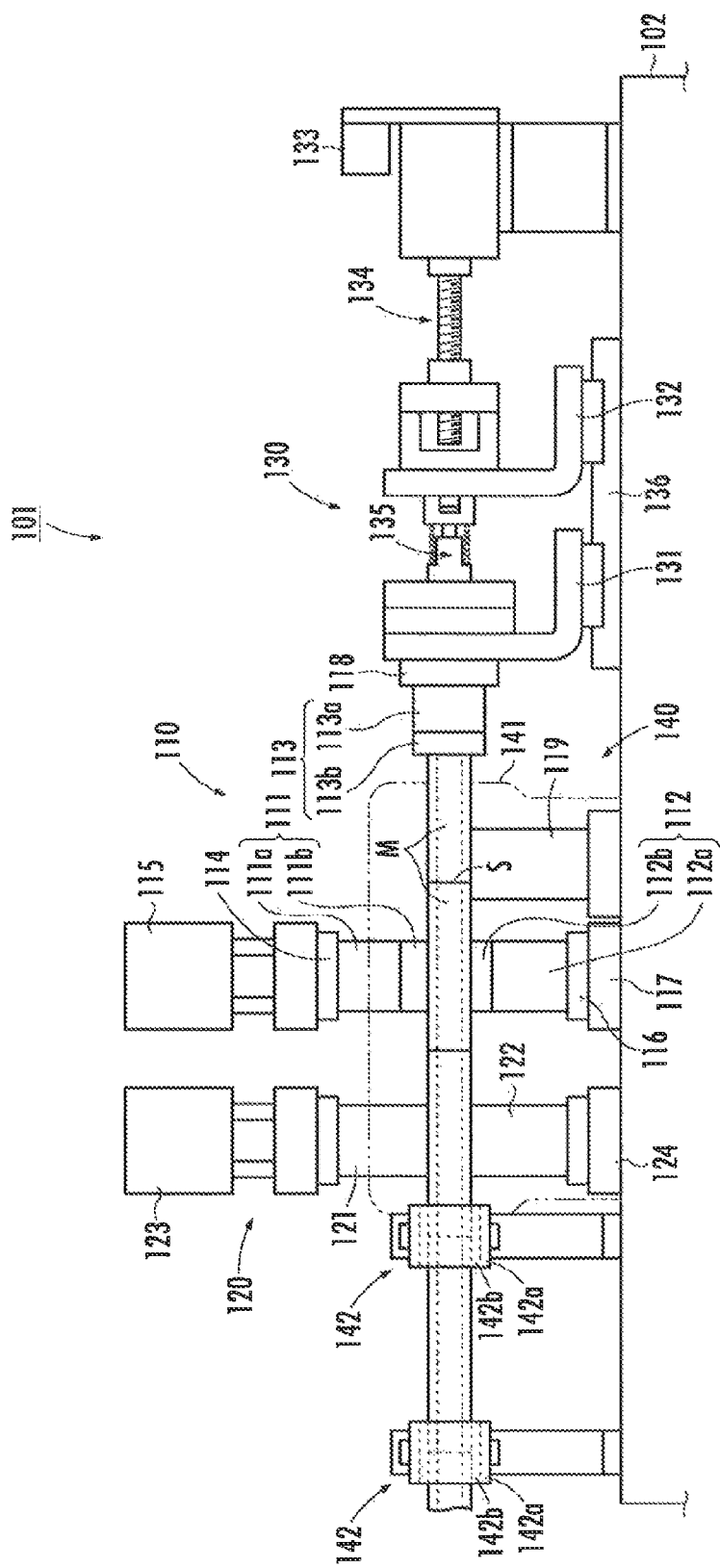
FIG. 6 is a side view of a current diffusion bonding apparatus according to a second embodiment of the present invention.

Referring to FIG. 6, the current diffusion bonding apparatus 101 is adapted to form a lengthy member by connecting many members to be bonded M in series. The current diffusion bonding apparatus 101 is similar to the current diffusion bonding apparatus 1, so that like or corresponding members will be assigned like reference numerals and only different aspects will be described.

The current diffusion bonding apparatus 101 has an electrode unit 110 which sandwiches and energizes members to be bonded M. The members to be bonded M in the present embodiment are cylindrical members.

The electrode unit 110 has three electrodes 111, 112 and 113. The electrodes 111 and 112, which vertically oppose each other, in the present embodiment are composed of columnar current electrodes 111a and 112a, respectively, which are made of copper, molybdenum, tungsten or the like, and resistive elements 111b and 112b fixed to opposing portions of the current electrodes 111a and 112a.

The upper end portion of the upper current electrode 111a is fixed to a piston of an air cylinder 115, which is vertically slidable, through the intermediary of an insulator 114. The lower end portion of the lower current electrode 112a is fixed to a pedestal 117 through the intermediary of an insulator 116.

The electrode 113 in the present embodiment is formed of a columnar current electrode 113a made of copper, molybdenum, tungsten or the like, and a resistive element 113b fixed to one end of the current electrode 113a. The other end of the current electrode 113a is fixed to a movable plate 131, which will be discussed hereinafter, through the intermediary of an insulator 118.

The electrodes 111 and 112 are disposed such that the axis lines thereof are collinear. The electrode 111 is pushed down by the air cylinder 115 to vertically sandwich the members to be bonded M between the electrodes 111 and 112. Further, the electrode 113 is disposed such that the axis line thereof is collinear with the axis lines of the members to be bonded M, and comes in contact with the surface of the member to be bonded M that is on the opposite side from the bonding surface S.

Thus, the members to be bonded M are held by the electrodes 111, 112 and 113 such that the axis lines of the members to be bonded M are horizontal. A receiving jig 119 that supports the members to be bonded M is also provided.

Further, the current electrodes 111a, 112a and 113a are respectively connected to the power supply unit 20 through cables (not shown) and constructed to be energizable. With the members to be bonded M held by the resistive elements 111b, 112b and 113b, a current is passed through the current electrodes 111a, 112a and 113a, thereby making it possible to heat the vicinity of the bonding surfaces S and to evenly heat the entire members to be bonded M. This permits continuous bonding in the same process.

The current diffusion bonding apparatus 101 has a cooling unit 120 that cools the members to be bonded M after the bonding process. The cooling unit 120 has coolers 121 and 122, which are in contact with the top and the bottom, respectively, of the member to be bonded M and which are adapted to be capable of cooling the members to be bonded M by a cooling fluid, such as pure water or tap water, circulated by a cooling mechanism (not shown).

The coolers 121 and 122 are collinearly disposed. Pushing the upper cooler 121 down by the air cylinder 123 vertically sandwiches the member to be bonded M between the upper cooler 121 and the lower cooler 122 supported by a pedestal 124. Thus, the cooling unit 120 functions also to support the members to be bonded M after the members to be bonded M are bonded.

The current diffusion bonding apparatus 101 has a pressurizing unit 130 that applies the pressure P to the bonding surfaces S of the members to be bonded M. The pressurizing unit 130 is constituted of a movable plate 131 to which the current electrode 113a is fixed, a pressurizing plate 132 for transmitting a pressure to the movable plate 131, a drive source 133 for driving the pressurizing plate 132, a ball screw mechanism 134 that transmits the driving force of the drive source 133 to actuate the pressurizing plate 132 in the lateral direction in FIG. 6, and a pressurization regulator 135 that adjusts the pressure transmitted from the pressurizing plate 132 to the movable plate 131.

The movable plate 131 is constructed to be slidable in the lateral direction relative to a linear motion guide 136 fixed to a base 102. The movable plate 131 corresponds to a member in the present embodiment.

The pressurizing plate 132 is constructed to be slidable in the lateral direction relative to the linear motion guide 136. The pressurizing plate 132 is positioned on the opposite side from the electrode unit 110 of the movable plate 131 through the intermediary of the pressurization regulator 135.

The drive source 133 in the present embodiment is a servo motor provided with a reduction gear. The servo motor 133 is provided with an encoder and fixed to the base 102 by a publicly known fixing means (not shown).

The ball screw mechanism 134 is the same as the ball screw mechanism 34 described above except that the pressurizing plate 132 is adapted to be movable in the lateral direction, so that the description of the ball screw mechanism 134 will be omitted. The pressurization regulator 135 is also the same as the pressurization regulator 35 described above, so that the description thereof will be omitted. Although not shown, a position sensor that detects the position of the movable table 131 is provided.

The current diffusion bonding apparatus 101 is provided with a vacuumizing unit 140 which turns a portion that includes at least the bonding surfaces S of the members to be bonded M into a vacuum atmosphere. The vacuumizing unit 140 is provided with a chamber 141 that surrounds the entire two members to be bonded M having the bonding surfaces S to be bonded. Although not shown, the vacuumizing unit 140 is provided with a vacuumizing device 42, a vacuum breaker 43, a vacuum sensor 44, and a temperature sensor 45, as with the vacuumizing unit 40 described above.

The chamber 141 in the present embodiment has holes that are in close contact with the electrodes 111 and 113 and the cooler 121 such that the electrodes 111 and 113 and the cooler 121 are slidable. The chamber 141 encloses the electrode 112, the cooler 122, the pedestals 117 and 124 for the electrode 112 and the cooler 122, and the receiving jig 119.

The vacuumizing unit 140 is further provided with a supporting section 142 for supporting the members to be bonded M after the members are bonded. The supporting section 142 is provided with a cylindrical member 142a formed of a hard material and a doughnut-shaped elastic member 142b positioned between the inner peripheral surface of the cylindrical member 142a and the outer peripheral surface of the member to be bonded M.

Air can be injected into the elastic member 142b by an air pump (not shown) to bring the elastic member 142b into close contact with the cylindrical member 142a and the member to be bonded M, thereby permitting the prevention of vacuum leakage. Further, Another supporting section 142 is provided as necessary on a portion located away from the chamber 141.

If vacuum leaks through an end of the member to be bonded M that has been bonded when the inside of the chamber 141 has been vacuumized, then a cylindrical elastic member (not shown) may be placed at the end. The elastic member and the inner peripheral surface of the member to be bonded M can be brought into close contact by injecting air into the elastic member by an air pump (not shown).

Although not shown, the current diffusion bonding apparatus 101 is further provided with a control unit 50, an operating section 51 and a display section 52, as with the current diffusion bonding apparatus 1 described above.

The processing for carrying out the current diffusion bonding method according to an embodiment of the present invention by using the current diffusion bonding apparatus 101 described above is the same as the method described with reference to FIG. 3, so that the description thereof will be omitted.

Thus, the current diffusion bonding apparatus 101 has the same advantages as those of the current diffusion bonding apparatus 1 described above. Further, using the current diffusion bonding apparatus 101 makes it possible to easily and continuously form a lengthy member by connecting many members to be bonded M in series.

The following will describe a current diffusion bonding apparatus 201, which is a third embodiment of the present invention.

Figure 7:
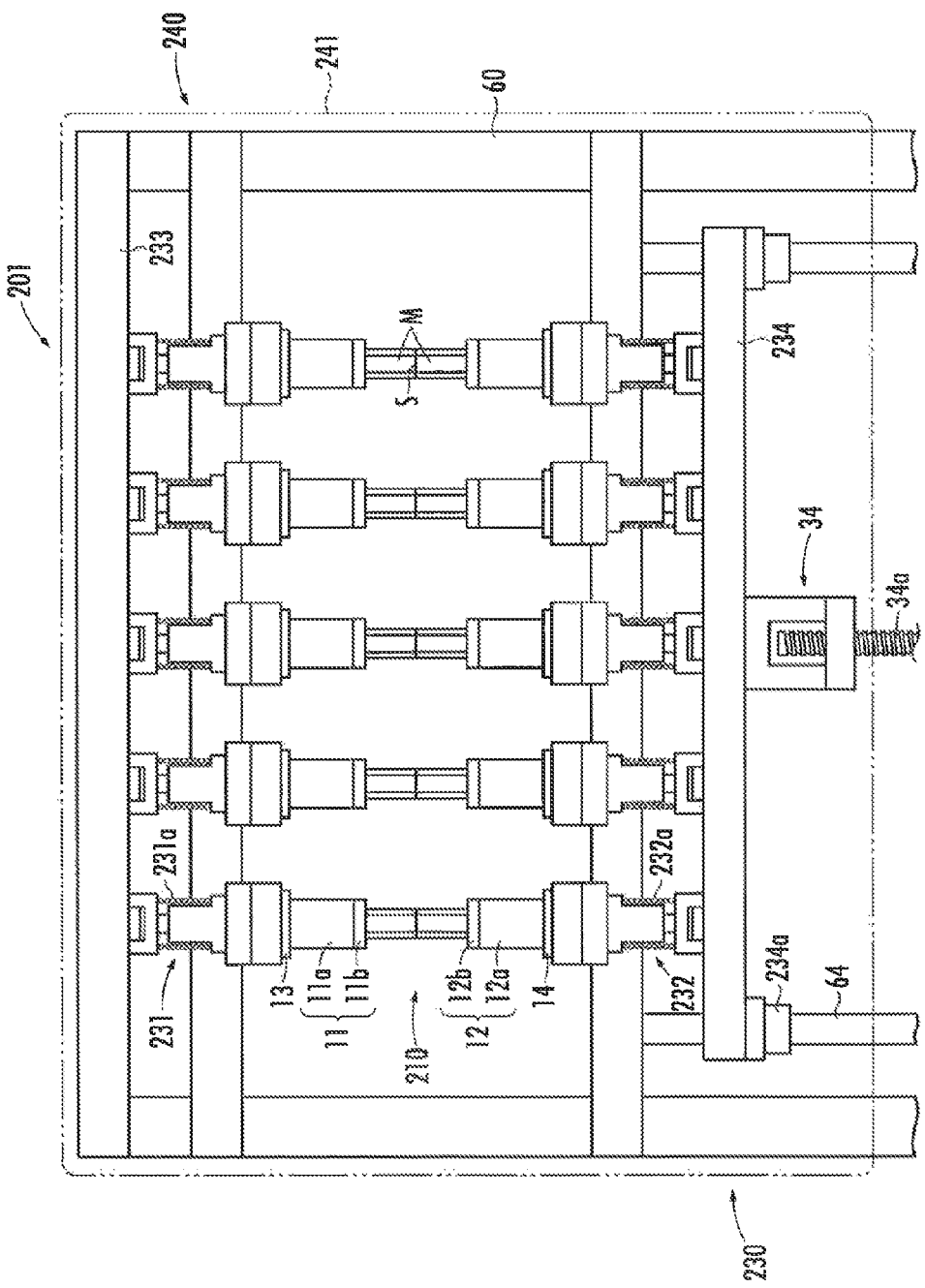
FIG. 7 is an enlarged front view illustrating the surrounding of an electrode unit of a current diffusion bonding apparatus according to a third embodiment of the present invention.

Referring to FIG. 7, the current diffusion bonding apparatus 201 is capable of simultaneously bonding many sets of members to be bonded M and M in parallel. The current diffusion bonding apparatus 201 is similar to the current diffusion bonding apparatus 1 described above, so that the illustration of a lower portion thereof will be omitted and the same or corresponding members will be assigned the same reference numerals and only different aspects will be described.

The current diffusion bonding apparatus 201 is provided with an electrode unit 210 that has a plurality of pairs of upper and lower electrodes 11 and 12. The members to be bonded M and M are sandwiched between the electrodes 11 and 12 and a current is passed therethrough.

The top portion of the upper current electrode 11a constituting each of the upper electrodes 11 is fixed to a pressurization regulator 231 through an insulator 13. The bottom portion of the lower current electrode 12a constituting each of the lower electrodes 12 is fixed to a pressurization regulator 232 through an insulator 14.

The upper and the lower electrodes 11 and 12 are disposed such that the axis lines thereof are collinear. The members to be bonded M and M are sandwiched between the upper and the lower electrodes 11 and 12. With the members to be bonded M and M sandwiched between resistive elements 11b and 12b, a current is passed through the upper and the lower current electrodes 11a and 12a, thereby making it possible to directly heat bonding surfaces S and to evenly heat the entire members to be bonded M and M. This permits continuous bonding in the same process.

The current diffusion bonding apparatus 201 is provided with a pressurizing unit 230, which applies a pressure P to the bonding surfaces S of the members to be bonded M and M. The pressurizing unit 230 is constituted of a plurality of pressurization regulators 231, a plurality of pressurization regulators 232, a first pressurizing plate 233 to which the top portions of the pressurization regulators 231 are fixed, a second pressurizing plate 234 to which the bottom portions of the pressurization regulators 232 are fixed, a servo motor 33 (refer to FIG. 1) for driving the second pressurizing plate 234, and a ball screw mechanism 34, which transmits the driving force of the servo motor 33 and which vertically moves the second pressurizing plate 234.

The pressurization regulators 231 and 232 both have the same construction as that of the pressurization regulator 35 described above. However, the elastic coefficient of a spring 231a of the pressurization regulator 231 is set to be smaller than the elastic coefficient of a spring 232a of the pressurization regulator 232. The use of the pressurization regulator 231 makes it possible to evenly pressurize the members to be bonded M and M.

The first pressurizing plate 233 is fixed to a chassis 60 and constructed as a top plate of the chassis 60 in the present embodiment.

The second pressurizing plate 234 has bearings (bushes) 234a at the four corners thereof, and is constructed to be slidable in the vertical direction relative to four guide rods 64 through the bearings 234a.

The servo motor 33 and a ball screw mechanism 34 are the same as the servo motor 33 and the ball screw mechanism 34 described above, so that the description thereof will be omitted. As the servo motor 33 is rotatively driven, a threaded shaft 34a rotates, causing the second pressurizing plate 234 to relatively travel up or down with respect to the threaded shaft 34a.

The current diffusion bonding apparatus 201 is provided with a vacuumizing unit 240, which turns a portion that includes at least the bonding surfaces S of all the members to be bonded M into a vacuum atmosphere. The vacuumizing unit 240 is provided with a chamber 241 that surrounds all the plurality of sets of the members to be bonded M and M having the bonding surfaces S to be bonded. Although not shown, the vacuumizing unit 240 is provided with a vacuumizing device 42, a vacuum breaker 43, a vacuum sensor 44, and a temperature sensor 45, as with the vacuumizing unit 40 described above.

The chamber 241 encloses all the pairs of the upper and the lower electrodes 11 and 12, the pressurization regulators 231 and 232, the first pressurizing plate 233, and the second pressurizing plate 234.

Although not shown, the current diffusion bonding apparatus 201 is further provided with a control unit 50, an operating section 51 and a display section 52, as with the current diffusion bonding apparatus 1 described above.

The processing for carrying out a current diffusion bonding method according to an embodiment of the present invention by using the aforesaid current diffusion bonding apparatus 201 will be described with reference to FIG. 8.

First, an operator sets the pressurization regulators 231 and 232 suited for the members to be bonded M and M (S1). Then, the operator sets the members to be bonded M and M between the upper and the lower electrodes 11 and 12 (S2). At this time, a positioning pin or the like may be used to assist the sandwiching of the members to be bonded M and M. Then, the operator closes the door (not shown) of the chamber 241.

When the operator turns on the start switch of the operating section 51 (YES in S3), the servo motor 33 is driven to compress the springs 231a and 232a of the pressurization regulators 231 and 232 until the full spring lengths of the springs 231a and 232a reach the full length of the lower main body of the spring block and to raise the second pressurizing plate 234 (S4) until the pressure P detected by a pressure sensor 37 exceeds a predetermined set pressure P1 (YES in S5). This causes a predetermined high pressure to be applied to the members to be bonded M and M through the first pressurizing plate 233 and the second pressurizing plate 234 thereby bringing the bonding surfaces S into close contact.

Subsequently, the vacuumizing device 42 is started. When the degree of vacuum in the chamber 41 detected by the vacuum sensor 44 reaches a predetermined value or less, the vacuumizing device 42 is stopped. Thus, the inside of the chamber 41 is vacuumized (S6).

While maintaining a state in which a predetermined pressure is being applied to the members to be bonded M and M, the power supply unit 20 is started to energize the upper and the lower electrodes 11 and 12 (S7). Thus, the members to be bonded M and M are heated, and the temperatures thereof increase, causing the members to be bonded M and M to thermally expand.

Thereafter, when the temperature T detected by the temperature sensor 45 exceeds a first set temperature T1, which is lower than a softening start temperature Ts of the members to be bonded M and M by a predetermined temperature (YES in S8), the servo motor 33 is driven to move the second pressurizing plate 234 down by a predetermined infinitesimal distance until the full spring length of the spring 231a of the pressurization regulator 231 increases and exceeds the full length of the lower main body of the spring block (S9). However, the state in which the upper surface of the spring block is in contact with the intervening block is maintained. Thus, the state in which the bonding surfaces S are in close contact by the biasing force of the spring 231a is maintained. However, the biasing force of the spring 231a is small, so that the base material of the members to be bonded M and M will not develop a deformation, such as distortion, bend or compression even when the temperature of the members to be bonded M and M further approaches the softening start temperature Ts.

If increasing the current passed through the upper and the lower current electrodes 11a and 12a, which sandwich the members to be bonded M and M, causes the temperature T of the vicinity of the bonding surfaces S of the members to be bonded M and M, which is detected by the temperature sensor 45, to exceed a second set temperature T2, which is higher than the first set temperature T1 by a predetermined temperature (YES in S10), then a state in which the temperature T detected by the temperature sensor 45 is maintained at the second set temperature T2 is continued for a predetermined time (S11). This is carried out by the direct output of the OFF signal or the ON signal to the power supply unit 20 from the temperature sensor 45. During this period of time, the members to be bonded M and M expand due to the thermal expansion and the pressure P gradually decreases. Then, the bonding surfaces S of the members to be bonded M and M are firmly bonded.

Further, this is repeated to sequentially bond the bonding surfaces S of all the members to be bonded M and M. If the position sensor 38 or the pressure sensor 37 detects an abnormal value, then the occurrence of the anomaly is displayed on the display section 52.

Thereafter, the power supply unit 20 is stopped, the vacuum breaker 43 is started to clear the vacuum state in the chamber 241, and the servo motor 33 is driven to move the second pressurizing plate 234 down (S12). Then, the operator takes the bonded members out of the chamber 241 (S13).

Thus, the current diffusion bonding apparatus 201 provides the same advantages as those of the current diffusion bonding apparatus 1 described above. Further, using the current diffusion bonding apparatus 201 makes it easy to simultaneously bond many sets of members to be bonded M and M in parallel.

The above has described the embodiments of the present invention; however, the present invention is not limited thereto. For example, the quantity or the mounting locations of the electrodes for the members to be bonded M are not limited.

Further, regarding the current diffusion bonding apparatus 201 that simultaneously bonds a plurality of sets of members to be bonded M and M, the description has been given of the case where the pressurization regulators 231 and 232 are provided for the respective sets of the members to be bonded M and M. The present invention, however, is not limited to this case. Alternatively, the current diffusion bonding apparatus may be provided with the pressurization regulators 231 and 232 commonly used for a plurality of sets of members to be bonded M and M.

Further, regarding the current diffusion bonding apparatus 1, the description has been given of the case where the lower electrode 12 is actuated. The present invention, however, is not limited to this case. Alternatively, the upper electrode 11 may be actuated or both the upper and the lower electrodes 11 and 12 may be actuated.

Further, regarding the current diffusion bonding apparatus 1, the description has been given of the case where the pressurizing unit 30 applies a pressure to the bonding surfaces S through the upper and the lower electrodes 11 and 12. The present invention, however, is not limited to this case. Alternatively, the pressure may be applied to the bonding surfaces S by bringing a member that corresponds to the movable table 31 into direct contact with the members to be bonded M and M without the intermediary of the upper and the lower electrodes 11 and 12.

Further, regarding the current diffusion bonding apparatus 1, the description has been given of the case where the pressurization regulator 35 is positioned between the movable table 31 and the pressurizing plate 32. The present invention, however, is not limited to this case. For example, the pressurization regulator may be positioned between the upper electrode 11 and the top plate 61, and the movable table 31 and the pressurizing plate 32 may be combined into one piece.

Further, regarding the current diffusion bonding apparatuses 1, 101 and 201, the descriptions have been given of the cases where the movable tables 31 and 131 and the second pressurizing plates 234 are reciprocated by the ball screw mechanisms 34 and 134. However, the mechanisms for reciprocating the movable tables 31 and 131 and the second pressurizing plate 234 are not limited to the ball screw mechanisms 34 and 134, and may be other publicly known mechanisms, such as rectilinear travel guide mechanisms.

Further, the descriptions have been given of the cases where the members corresponding to the elastic members in the present invention are springs 35d, 231a and 232a; however, the elastic members are not limited thereto. The elastic members may alternatively be members composed of an elastic material, such as rubber, or fluid cushions using a hydraulic cylinder, an air cylinder or the like, and there is no limitation to the types thereof, including a mechanical type, a hydraulic type and a pneumatic type. However, mechanical springs are advantageously used for their high repeatability in repeated use.

The invention claimed is:

1. A current diffusion bonding apparatus that bonds a plurality of members to be bonded, the bonding surfaces of which are abutted to each other, by the passage of a current through the members to be bonded, comprising:
   a plurality of electrodes which sandwich the plurality of the members to be bonded and which are electrically conductible with the plurality of the members to be bonded;
   a power supply unit that supplies a current to the plurality of electrodes;
   a first pressurizing unit which applies a pressure to the bonding surfaces while restricting a displacement in a direction of expansion relative to a sandwiching direction of the plurality of the members to be bonded, which are sandwiched by the plurality of the electrodes;
   a second pressurizing unit which applies a pressure based on an elastic force of an elastic member that elastically deforms according to a displacement in the direction of expansion relative to the sandwiching direction of the plurality of the members to be bonded, which are sandwiched by the plurality of the electrodes, to the bonding surfaces through the plurality of the electrodes;
   a temperature sensor which detects a temperature in a vicinity of the bonding surfaces; and
   a pressurization selecting unit which selects one of the first pressurizing unit and the second pressurizing unit to apply a pressure to the bonding surfaces based on the temperature detected by the temperature sensor.

2. The current diffusion bonding apparatus according to claim 1, wherein
   the first pressurizing unit applies a pressure to the bonding surfaces while restricting a position of a member to which the electrodes are fixed, and
   the second pressurizing unit applies a pressure to the bonding surfaces while applying an elastic force of the elastic member to the member.

3. A current diffusion bonding method for bonding a plurality of members to be bonded, the bonding surfaces of which are abutted to each other, by the passage of a current through the members to be bonded, comprising steps of:
   restricting a displacement in a direction of expansion relative to a sandwiching direction of the plurality of the members to be bonded and applying a pressure to the plurality of the bonding surfaces so as to sandwich the members to be bonded between a plurality of electrodes that are electrically conductible with the members to be bonded;
   supplying a current to the plurality of the electrodes; and
   when a temperature in a vicinity of the bonding surfaces exceeds a predetermined temperature, clearing the restriction on the displacement of the plurality of the members to be bonded and applying a pressure, which is based on an elastic force of an elastic member that elastically deforms according to a displacement in the direction of expansion relative to the sandwiching direction of the plurality of the members to be bonded, which are sandwiched by the plurality of the electrodes, to the bonding surfaces through the plurality of the electrodes.

4. The current diffusion bonding apparatus according to claim 1, wherein the pressurization selecting unit selects the first pressurizing unit to apply pressure to the bonding surfaces when the temperature detected by the temperature sensor is less than or equal to a predetermined temperature, and
   the pressurization selecting unit selects the second pressurizing unit to apply pressure to the bonding surfaces when the temperature detected by the temperature sensor is greater than the predetermined temperature.

5. The current diffusion bonding apparatus according to claim 4, wherein the pressure applied by the first pressurizing unit is greater than the pressure applied by the second pressurizing unit.

6. The current diffusion bonding apparatus according to claim 4, wherein the predetermined temperature is equal to a softening start temperature of the plurality of members to be bonded minus a predetermined temperature adjustment value.

7. The current diffusion bonding apparatus according to claim 5, wherein the pressure applied by the first pressurizing unit is greater than the pressure applied by the second pressurizing unit.

8. The current diffusion bonding apparatus according to claim 1, wherein the pressure applied by the first pressurizing unit is greater than the pressure applied by the second pressurizing unit.

9. The current diffusion bonding method according to claim 3, wherein the predetermined temperature is equal to a softening start temperature of the plurality of members to be bonded minus a predetermined temperature adjustment value.

10. The current diffusion bonding method according to claim 9, wherein the pressure applied while restricting displacement of the plurality of members to be bonded is greater than the pressure applied when the restriction on the displacement of the plurality of members to be bonded is cleared.

11. The current diffusion bonding method according to claim 3, wherein the pressure applied while restricting displacement of the plurality of members to be bonded is greater than the pressure applied when the restriction on the displacement of the plurality of members to be bonded is cleared.

* * * * *